(12) United States Patent
Jang

(10) Patent No.: US 8,851,461 B2
(45) Date of Patent: Oct. 7, 2014

(54) SIDE POSITIONING DEVICE FOR A SYSTEM FOR ASSEMBLING VEHICLE BODY PANELS

(75) Inventor: Yoon Jang, Incheon (KR)

(73) Assignee: Hyundai Motor Company, Seoul (KR)

( * ) Notice: Subject to any disclaimer, the term of this patent is extended or adjusted under 35 U.S.C. 154(b) by 102 days.

(21) Appl. No.: 13/530,529

(22) Filed: Jun. 22, 2012

(65) Prior Publication Data

US 2013/0140749 A1    Jun. 6, 2013

(30) Foreign Application Priority Data

Dec. 6, 2011    (KR) ........................ 10-2011-0129885

(51) Int. Cl.
| | | |
|---|---|---|
| *B23Q 1/25* | (2006.01) | |
| *B23Q 17/00* | (2006.01) | |
| *B21D 39/03* | (2006.01) | |
| *B21D 11/00* | (2006.01) | |
| *B66C 23/00* | (2006.01) | |

(52) U.S. Cl.
USPC ............. 269/55; 29/407.05; 29/428; 414/728

(58) Field of Classification Search
USPC ........................... 269/55; 29/407.05, 428, 714
See application file for complete search history.

(56) References Cited

U.S. PATENT DOCUMENTS

| | | | | |
|---|---|---|---|---|
| 3,989,145 A | * | 11/1976 | Vaishnav | 414/427 |
| 4,435,116 A | * | 3/1984 | Van Deberg | 414/728 |
| 4,736,515 A | * | 4/1988 | Catena | 29/714 |
| 4,802,616 A | * | 2/1989 | Naruse et al. | 228/4.1 |
| 5,135,205 A | * | 8/1992 | Bedard | 269/17 |
| 5,203,811 A | * | 4/1993 | Hirotani et al. | 29/407.05 |
| 5,902,496 A | * | 5/1999 | Alborante | 219/86.24 |
| RE36,541 E | * | 2/2000 | Rossi | 228/6.1 |
| 6,065,199 A | * | 5/2000 | Bossotto et al. | 29/407.01 |
| 6,089,440 A | * | 7/2000 | Brusha | 228/44.3 |
| 6,490,906 B1 | * | 12/2002 | Bailey | 72/457 |
| 6,866,327 B2 | * | 3/2005 | Willard | 296/136.06 |
| 6,954,980 B2 | * | 10/2005 | Song | 29/714 |
| 7,008,166 B1 | * | 3/2006 | Grimes | 414/663 |
| 7,243,904 B1 | * | 7/2007 | Grimes | 254/2 B |

(Continued)

FOREIGN PATENT DOCUMENTS

| | | |
|---|---|---|
| JP | 05124549 A | 5/1993 |
| JP | 2002274451 A | 9/2002 |

(Continued)

*Primary Examiner* — Lee D Wilson
*Assistant Examiner* — Alvin Grant
(74) *Attorney, Agent, or Firm* — Edwards Wildman Palmer LLP; Peter F. Corless

(57) ABSTRACT

A side home-position device for a vehicle body assembly system for various vehicle types is disclosed, which can be used to return a common use side jig that controls a side panel to a working position of a main buck process. The device includes a post frame that is disposed in a vertical direction corresponding to the working position, a moving member that is movably disposed at the post frame in a width direction of a vehicle body and substantially supports the common use side jig, a main control unit in connection with the moving member and which returns the common use side jig to an original position, a clamper disposed on the moving member which clamps a matching portion of the common use side jig for the moving member, and an operating portion disposed at the post frame and which moves the moving member in a width direction of the vehicle body.

19 Claims, 6 Drawing Sheets

(56) References Cited

U.S. PATENT DOCUMENTS

| | | | |
|---|---|---|---|
| 7,677,428 B2 * | 3/2010 | Kilibarda | 228/4.1 |
| 7,685,699 B2 * | 3/2010 | Baulier et al. | 29/700 |
| 7,857,539 B2 * | 12/2010 | Baulier et al. | 403/31 |
| 8,231,117 B2 * | 7/2012 | Nishikawa et al. | 269/55 |
| 8,479,369 B2 * | 7/2013 | Sugimoto et al. | 29/525.01 |
| 2003/0051328 A1 * | 3/2003 | Song | 29/428 |
| 2011/0140330 A1 * | 6/2011 | Nishikawa et al. | 269/55 |

FOREIGN PATENT DOCUMENTS

| | | |
|---|---|---|
| JP | 2005289326 A | 10/2005 |
| KR | 10-0814784 | 3/2008 |
| KR | 10-0897267 | 5/2009 |
| KR | 10-2009-0058240 A | 6/2009 |

* cited by examiner

100

US 8,851,461 B2

SIDE POSITIONING DEVICE FOR A SYSTEM FOR ASSEMBLING VEHICLE BODY PANELS

CROSS-REFERENCE TO RELATED APPLICATION

This application claims priority to and the benefit of Korean Patent Application No. 10-2011-0129885 filed in the Korean Intellectual Property Office on Dec. 6, 2011, the entire contents of which are incorporated herein by reference.

BACKGROUND OF THE INVENTION (a) Field of the Invention

The present invention relates to a vehicle body assembly system. More particularly, the present invention relates to a home-position device for an assembly system, particularly for assembling side panels of various kinds of vehicles in a vehicle body main buck process.

(b) Description of the Related Art

Generally, a vehicle body is formed through a series of steps including fabrication of various panels in a vehicle body sub-process, followed by assembly of the panels to form a body in white (B.I.W.).

The vehicle body includes a floor panel that supports seats and a driving portion (such as an engine and a drive shaft) in a lower portion, both side panels, a roof panel that is disposed at an upper side, a plurality of roof rails, a cowl panel, a back panel, and a package tray.

Assembly of the vehicle body components is performed in a vehicle body build-up process (which can also be referred to as a main buck process). In this build-up or "main buck" process, the various panels are welded to form the shape of a vehicle. For example, side panels and roof panels for various vehicle models are sequentially fed to a build-up or main buck process through top bogies or hangers according to the order of the vehicles, and lower floor panels are supplied to the main buck process through bogies or shuttles according to the order of the vehicles. Then, a jig, such as a rotary jig which can be rotated to three sides, serves to clamp and couple the panels supplied to the main buck process.

For example, after a back panel is welded on a floor panel, both side panels, a roof panel, a roof rail, a cowl panel, and a package tray are welded thereon in the vehicle body build-up process through a vehicle body assembly system.

The vehicle body assembly system uses a side hanger and a side gate to control a side panel, sets the side panel on the floor panel, sets a roof panel, a roof rail, a cowl panel, and a package tray on the side panel, and welds their connection portions through a welding robot.

However, side gates are fixedly disposed at four sides of a main rotation buck in conventional systems, so it is impossible to assemble more than five kinds of vehicle bodies with such systems. It is therefore difficult to use a common assembly system for assembling various kinds of vehicles, and thus a long time is required for preparation of a facility and initial spending increases when further vehicle types are added to such a vehicle body assembly system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a home-position device, particularly a side home-position device, for a vehicle body assembly system for various kinds of vehicles. The present invention has advantages of returning a common use side jig to a work position of a main buck process, wherein the common use side jig controls a side panel for various vehicles that is assembled to form a vehicle body.

According to one aspect, side home-position device for a vehicle body assembly system for various kinds of vehicles is provided. The side home-position device may be used to return a common use side jig that controls a side panel to a working position of a main buck process. According to this aspect, the side home-position device may include: a post frame that is disposed in a vertical direction corresponding to the working position; a moving member that is disposed at the post frame so as to be movable in a width direction of a vehicle body, and which substantially supports the common use side jig; a main control unit that is disposed on the moving member and is configured and arranged to return the common use side jig to an original position; a clamper that is disposed on the moving member and is configured and arranged for clamping a matching portion of the common use side jig for the moving member; and an operating portion that is disposed at the post frame and is configured and arranged to move the moving member in a width direction of the vehicle body.

According to various embodiments, the moving member may support the common use side jig that is moved by a robot.

According to various embodiments, the moving member may include a plurality of seat portions on which the matching portion that is prepared on the common use side jig can be disposed.

According to various embodiments, the main control unit may include a carved block that is disposed on the seat portion in a moving direction of a vehicle body.

According to various embodiments, the carved block may correspond to an engraved block that is disposed on the matching portion of the common use side jig, and may be configured and arranged to control the common use side jig in a moving direction and a height direction of the vehicle body.

According to various embodiments, the carved block may form a V shape protrusion.

According to various embodiments, the protrusion may be engaged with a V shape groove of the engraved block.

According to various embodiments, a stopper may be integrally formed on the carved block to determine the original position of the common use side jig for the moving member.

According to various embodiments, the side home-position device may further include a sub-control unit that is disposed on the moving member and which is configured and arranged to move the common use side jig in a width direction of the vehicle body, and wherein the main control unit controls the common use side jig so as to corresponded to the moving member.

According to various embodiments, the sub-control unit eliminates matching play/play (i.e. movement or space for movement) of the common use side jig for the moving member. In other words, the sub-control unit can reduce or eliminate movement of the common use side jig such that it can be better or more easily supported by the moving member. According to various embodiments, the sub-control unit may include an operating cylinder that is disposed on the moving member so as to be connected to the common use side jig through an operating rod.

According to various embodiments, the moving member may include a plurality of seat portions on which the matching portion that is formed on the common use side jig can seat. Further, a combination block that is combined with a combination portion may be disposed on the operating rod.

According to various embodiments, the moving member may include a plurality of seat portions on which the matching portion that is disposed on the common use side jig can seat. Further, a stopper may be disposed on the seat portion to determine an original position of the common use side jig that is moved by the operating cylinder.

According to various embodiments, the moving member may include a plurality of seat portions on which the matching portion that is disposed on the common use side jig can seat. Further, the main control unit may include a carved block that is disposed at the seat portion in a moving direction of the vehicle body. Still further, a stopper may be integrally formed on the carved block to determine an original position of the common use side jig that is moved by the operating cylinder.

According to various embodiments, the clamper may include a clamp block that is rotated by a clamp cylinder, and which is configured and arranged to clamp a matching part of the common use side jig for the moving member.

According to various embodiments, a first slanted surface may be formed on the clamp block corresponding to the matching part of the common use side jig.

According to various embodiments, the clamp block further has a second slanted surface that may correspond to a further matching part, where the first slanted surface is disposed on the matching portion of the common use side jig to control the common use side jig in a width direction and a height direction of the vehicle body.

According to various embodiments, the moving member may be movably in connection with a rail member that is disposed on the post frame.

According to various embodiments, the operating portion may move the moving member to a predetermined position corresponding to a width of the vehicle body, and may set the side panel at a suitable position of vehicle body. This predetermined position may vary depending on the type of vehicle.

In an exemplary embodiment of the present invention, the common use side jig is configured and arranged to commonly control various types of side panels that are assembled in forming the vehicle body, and the common use side jig is accurately positioned on a work position of a main buck process to accurately set the side panel in the vehicle body.

Accordingly, the present invention can be used to flexibly manufacture a wide variety of vehicles, and therefore a facility preparation time can be reduced and an initial investment cost can be saved when additional types of vehicles are added.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings.

DESCRIPTION OF SYMBOLS

Figure 1:
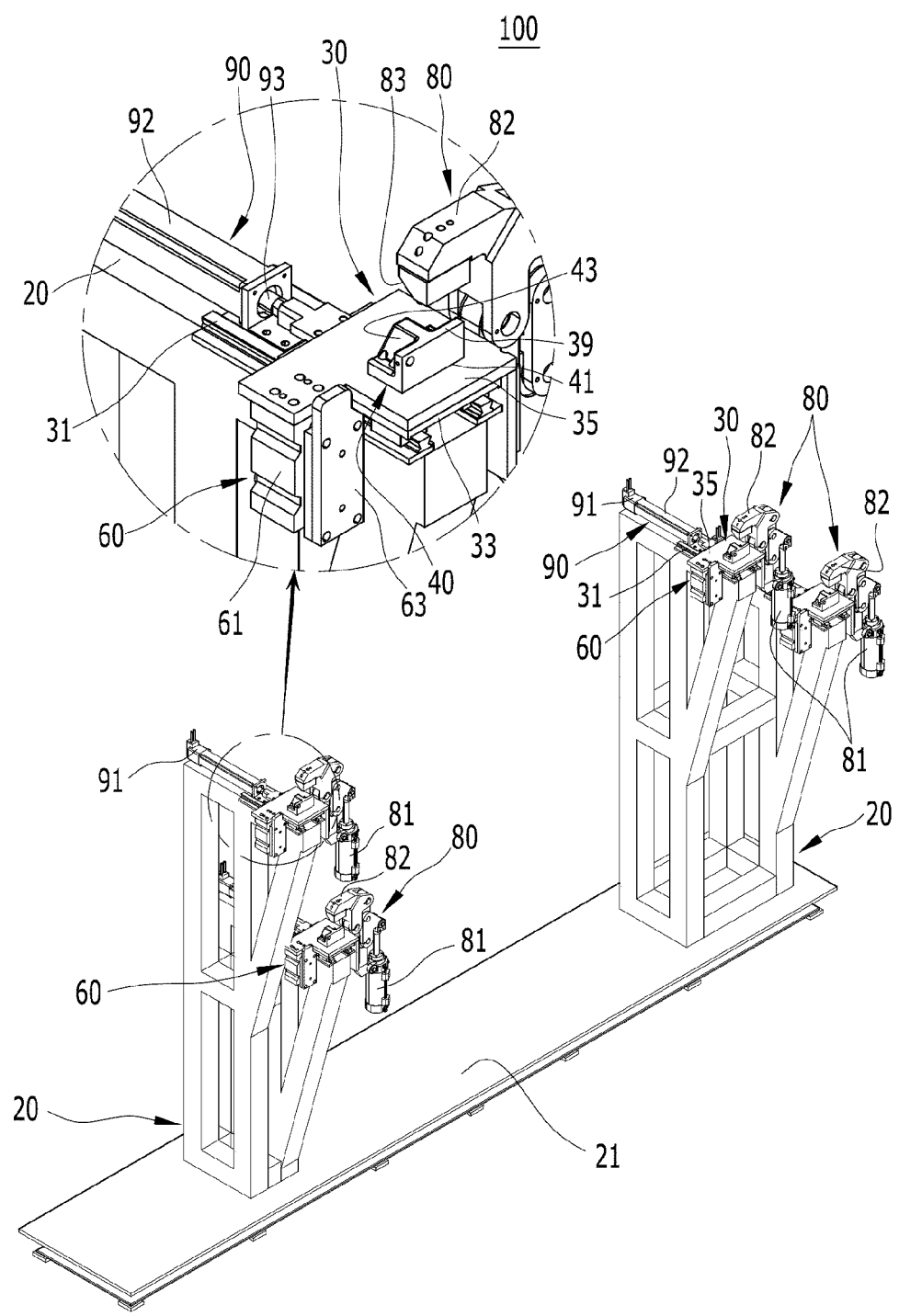
FIG. 1 and FIG. 2 are perspective views showing a side home-position device for a vehicle body assembly system according to an exemplary embodiment of the present invention.

1 . . . side panel
10 . . . common use side jig
11 . . . control portion
13 . . . matching portion
14 . . . jig frame
15 . . . connecting bracket
16 . . . engraved block
17 . . . groove
18 . . . combination portion
19 . . . second slanted surface
20 . . . post frame
21 . . . base
30 . . . moving member
31 . . . rail member
33 . . . moving block
35 . . . seat portion
39 . . . stopper
40 . . . main control unit
41 . . . carved block
43 . . . protrusion
60 . . . sub-control unit
61 . . . operating cylinder
63 . . . combination block
80 . . . clamper
81 . . . clamp cylinder
82 . . . clamp block
83 . . . first slanted surface
90 . . . drive portion
91 . . . motor
93 . . . operating rod It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

Detailed Description Of The Embodiments

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

In order to clarify the present invention, parts that are not connected with the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

Figure 2:
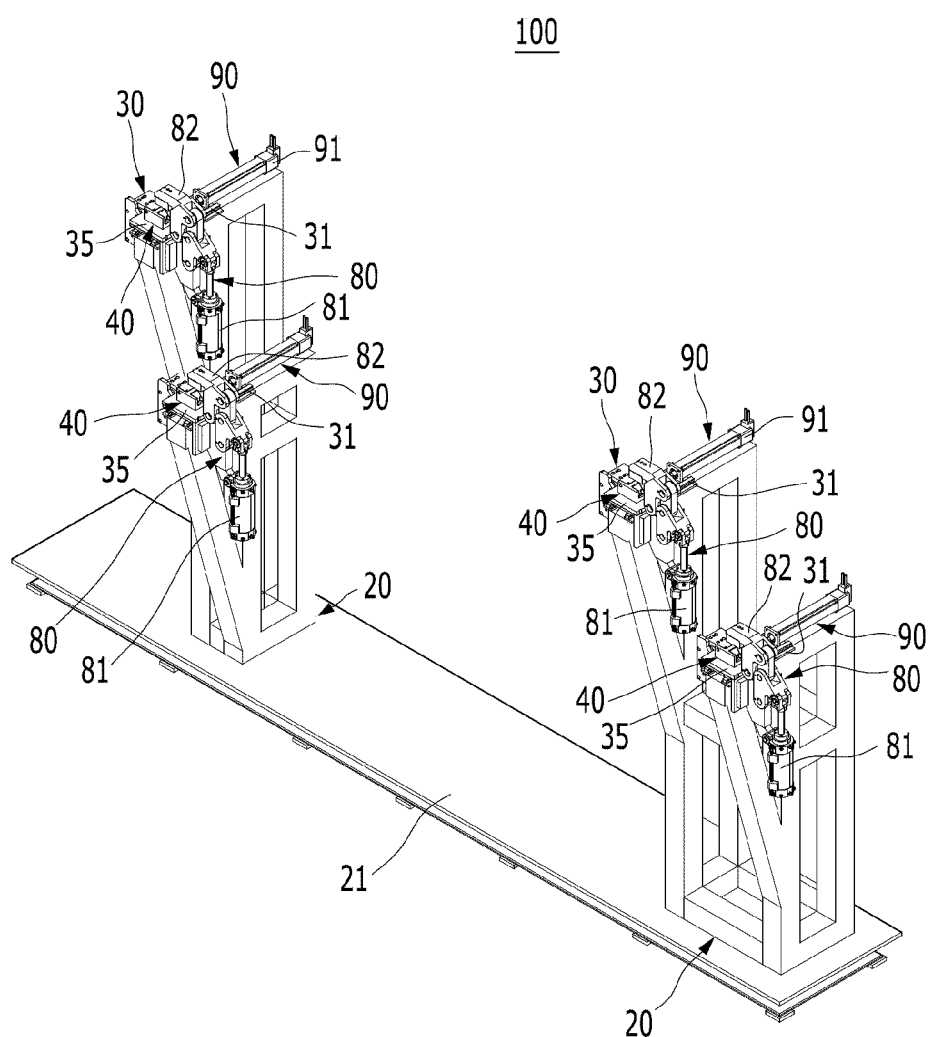
Figure 3:
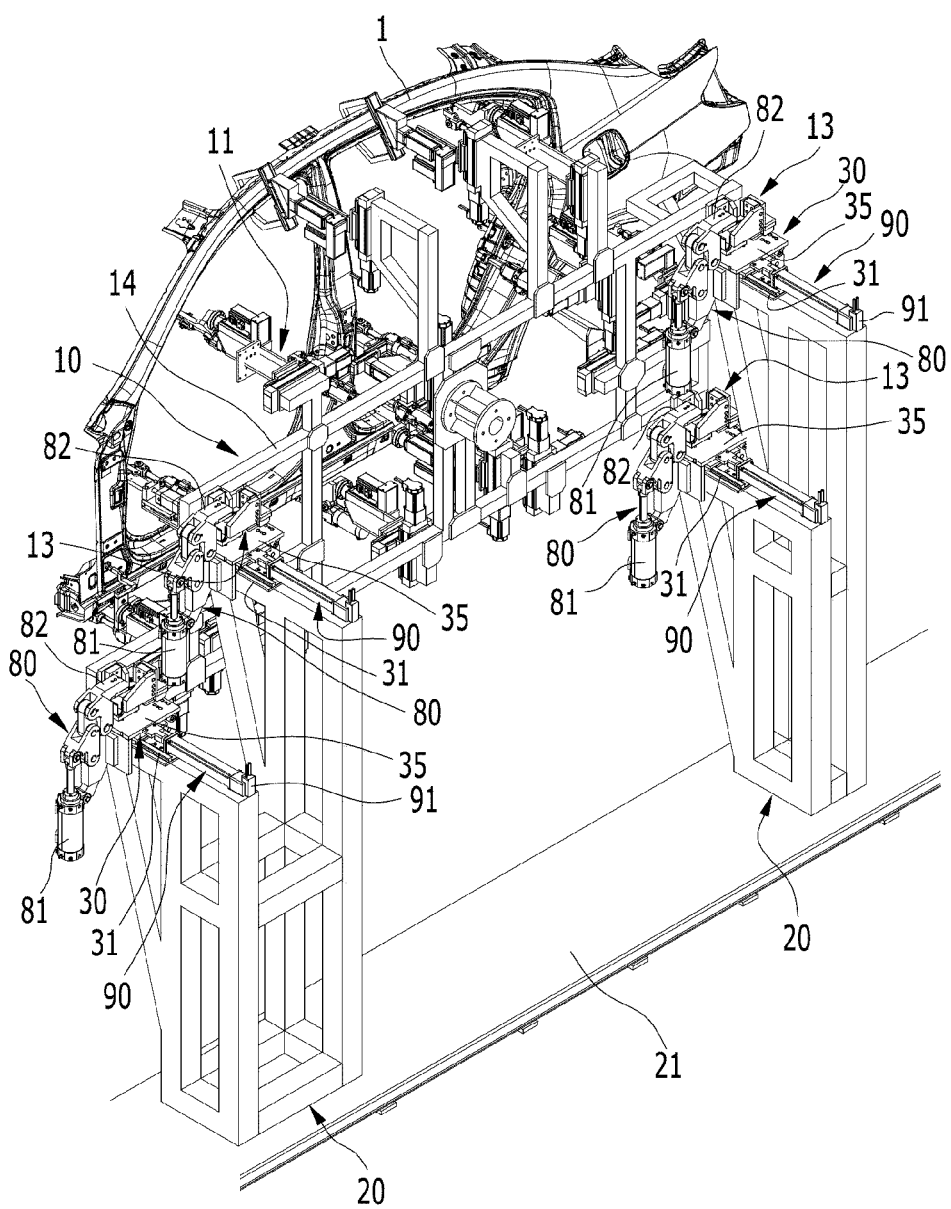
FIG. 3 is a perspective view showing a condition in which a side common jig is controlled in a side home-position device according to an exemplary embodiment of the present invention.

FIG. 1 and FIG. 2 are perspective views showing a side home-position device for a body assembly system for various types of vehicles according to an exemplary embodiment of the present invention, and FIG. 3 is perspective view showing a condition in which a side common jig is controlled in a side home-position device according to an exemplary embodiment of the present invention.

Referring to FIG. 1 to FIG. 3, a side home-position device 100 according to an exemplary embodiment of the present invention uses a jig to control all main buck assembly components that are moved into an assembled condition in a vehicle body sub-assembly line, and can be applied to a main buck process (which is also commonly referred to as a "vehicle body build-up process").

According to this embodiment, the main buck assembly components include a floor panel, both side panels, a roof panel, a cowl panel, a roof rail, and a package tray.

In this case, the floor panel is transferred to a working portion of a main buck process through a transfer unit, and both side panels are controlled by a jig so as to be set on the floor panel for assembly thereto.

Hereinafter, the floor panel on which the side panels are set is also referred to as a "vehicle body", and a transferring direction of the vehicle body can be defined as a vehicle body transferring direction (wherein the vehicle body corresponds to the floor panel).

In this industry, the transferring direction of the vehicle body can be defined as a "T direction", a width direction of the vehicle body can be define as an "L direction", a height direction of the vehicle body can be define as an "H direction". As such, the terms transferring direction, width direction, and height direction of the vehicle body are generally used in an exemplary embodiment of the present invention, and the terms L, T, and H direction can also be used.

Figure 4:
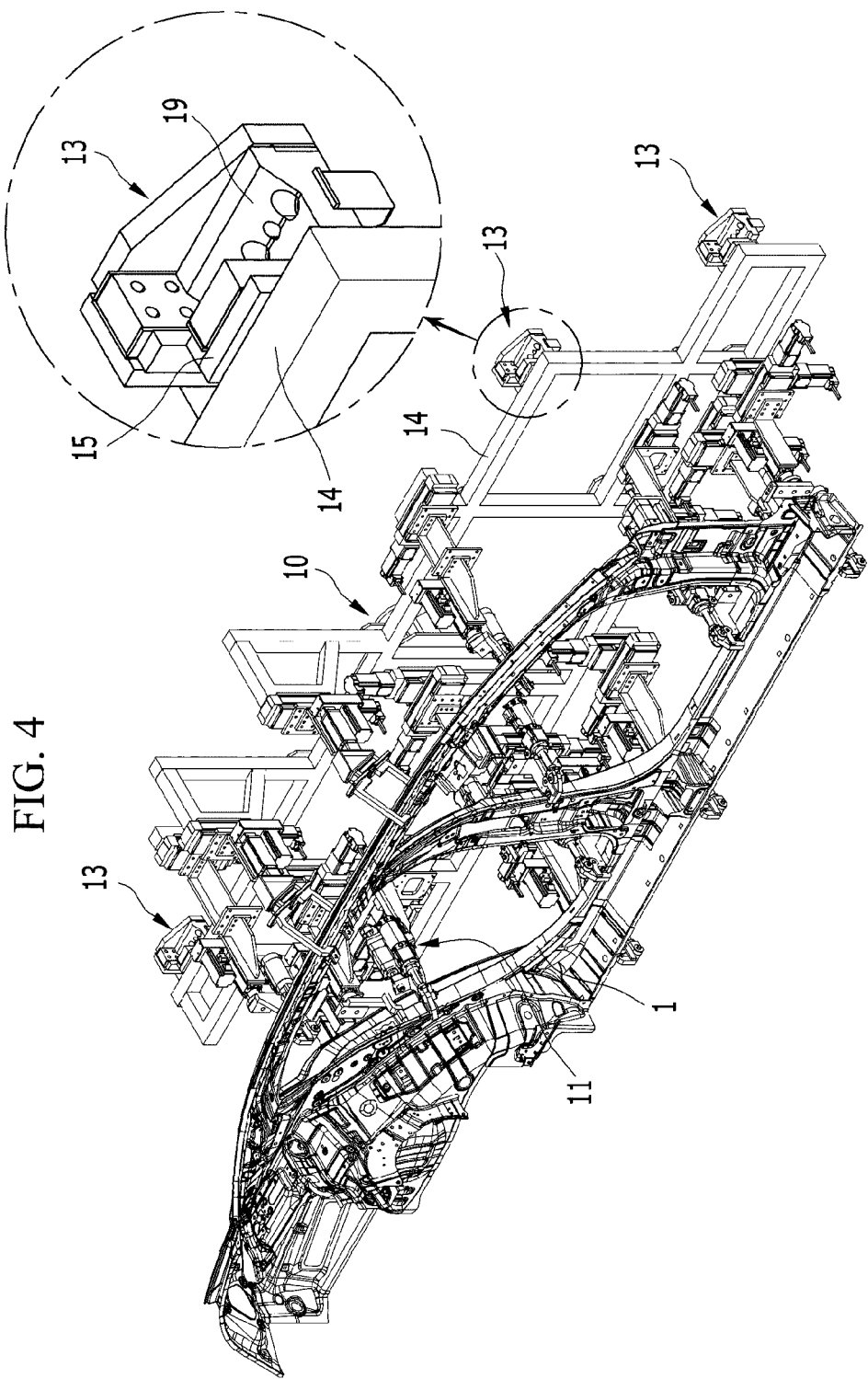
FIG. 4 shows a side jig that is applied to a side home-position device of a vehicle body assembly system that can be commonly used for various kinds of vehicles according to an exemplary embodiment of the present invention.

The vehicle body assembly system includes a common use side jig 10 that can control a side panel 1 having various specifications according to various vehicle types, as shown FIG. 3 and FIG. 4.

In particular, the common use side jig 10 deals with various types of side panels 1 through a plurality of control portions 11 that can be operated by electrical energy or the like, such that the common use side jig 10 clamps the side panel 1 and transfers the side panel 1 to a main buck process.

The side home-position device 100 moves the common use side jig 10, which clamps the side panel 1, to an original position of a main buck process. In particular, the side home-position device 100 moves the side panel 1 to a position that accurately matches the proper position for the side panel 1 on the vehicle body.

According to an exemplary embodiment, the side home-position device 100 includes a post frame 20, a moving member 30, a main control unit 40, a sub-control unit 60, a clamper 80, and a drive portion 90.

The post frame 20 is configured and arranged to substantial support various kinds of constituent elements that are to be hereinafter explained in an exemplary embodiment of the present invention. The post frame 20 may be provided with auxiliary components such as brackets, support blocks, and collars.

Thus, the auxiliary components can be collectively be referred to as post frames 20 except in exceptional cases in the present exemplary embodiment.

As shown in FIGS. 1 and 2, the post frames 20 are disposed on a bottom surface (base 21) extending in a vertical direction. In particular, two post frames 20 can be positioned to correspond to both sides of the vehicle body that is transferred to a work position of a main buck process.

As shown, the post frames 20 can have a plurality of bars, typically formed or metal or the like, that can be connected in a transfer direction, a width direction, and a height direction of a vehicle body. The post frames 20 can be vertically disposed on a base 21 at a predetermined distance from each other.

In particular, the post frames 20 may be disposed at a predetermined distance from each other at any suitable position such that they do not interfere with the movement of a common use robot that fixes the common use side jig 10 with a tool changer.

The respective post frames 20 can include at least one pair of posts each having an upper surface, wherein the height of the upper surfaces and the number of posts can be varied according to the shape and the size of the common use side jig 10. The height and the number of pairs of posts are not limited to that shown in the exemplary embodiment of the present invention.

The moving member 30 supports the common use side jig 10, which can be transferred into its appropriate position by the common use robot. According to the embodiment shown, at least two moving members 30 are provided disposed at an upper surface of the post frame 20.

Each moving member 30 is disposed to be movable in a width direction of the vehicle body by the drive portion 90 that is to be explained later.

The moving member 30 can be moved by the drive portion 90 in a width direction of the vehicle body to provide a suitable width for the vehicle body that is being assembled. When the moving member 30 is properly positioned, the common use side jig 10 is separated from the common use robot and is loaded thereon.

As shown in the figures, the moving member 30 includes a moving block 33 that is slidably engaged with a rail member 31 that is disposed on the upper surface of the post frame 20. As further shown, a seat portion 35 where the common use side jig 10 can be seated is formed on the moving block 33.

In particular, the seat portion 35 can be configured and arranged to match a part of the common use side jig 10, and the matching part of the common use side jig 10 can be seated therein.

For example, as shown in FIG. 3 and FIG. 4, in this case, the matching part of the common use side jig 10 includes a matching portion 13 which can be seated on the seat portion 35 of the moving member 30.

As shown in the embodiments of FIGS. 3 and 4, at least two matching portions 13 are formed at a jig frame 14 of the common use side jig 10 corresponding to the moving member 30, and the matching portions 13 are provided with a side surface and a bottom surface that are connected to the jig frame 14 through a connecting bracket 15.

When the matching portion 13 of the common use side jig 10 is seated on the seat portion 35 of the moving member 30 by the common use robot in an exemplary embodiment of the present invention, the common use robot can be separated from the common use side jig 10.

The main control unit 40 can be used to return the matching portion 13 of the common use side jig 10 to the seat portion 35 of the moving member 30 in an exemplary embodiment of the present invention.

Figure 5:
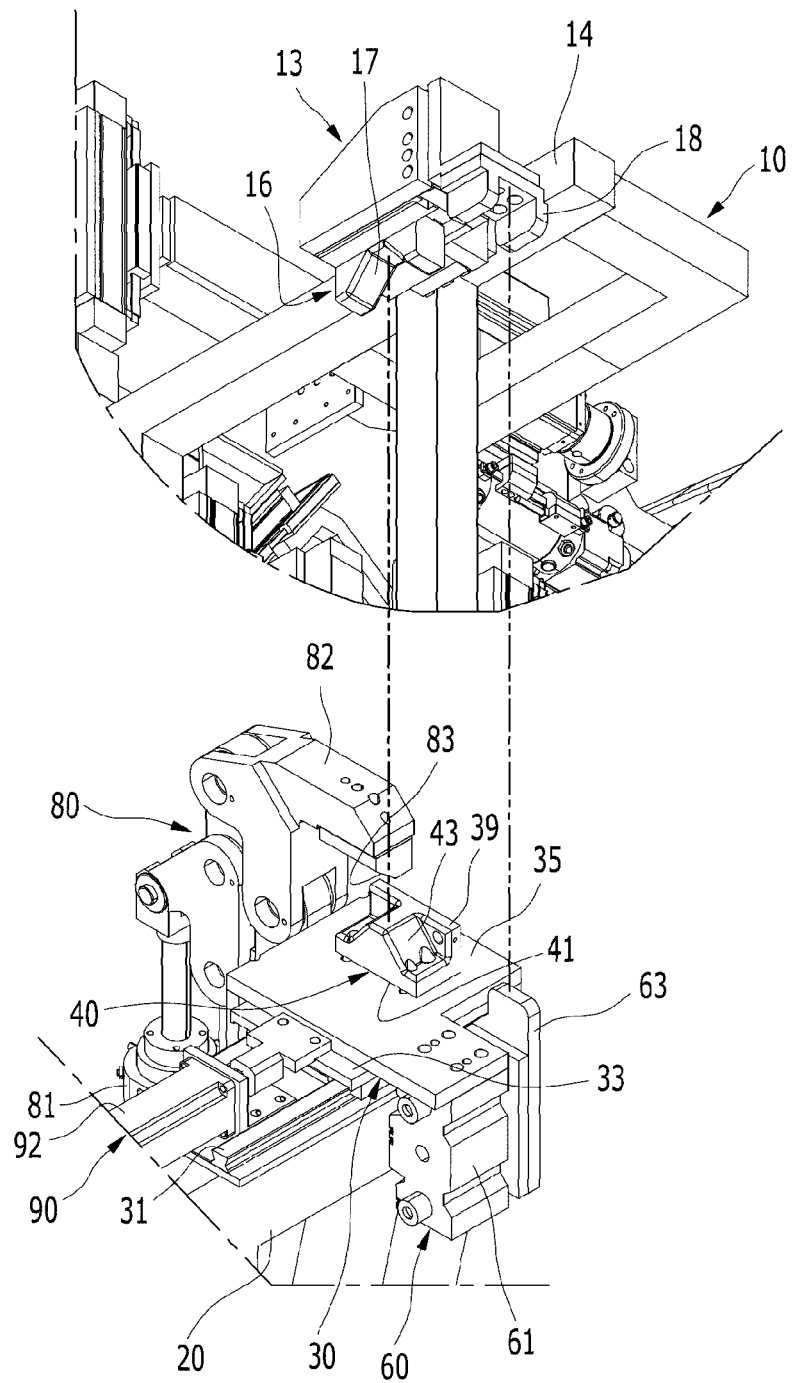
FIG. 5 shows a main control unit and a sub-control unit that are applied to a side home-position device according to an exemplary embodiment of the present invention.

FIG. 5 shows a main control unit 40 and a sub-control unit 60 that are applied to a side home-position device for a vehicle body assembly system for various kinds of vehicles according to an exemplary embodiment of the present invention.

Referring to FIG. 5, the main control unit 40 according to an exemplary embodiment of the present invention is configured on the moving member 30 and includes a carved block 41 that is disposed on the seat portion 35 of the moving member 30.

When the matching portion 13 of the common use side jig 10 is matched with the seat portion 35 of the moving member 30, the carved block 41 can be used to control the common use side jig 10 in a transfer direction and a height direction of the vehicle body.

In particular, the carved block 41 is matched with an engraved block 16 that is disposed on the matching portion 13 of the common use side jig 10, and controls the common use side jig 10 in a transfer direction and a height direction of the vehicle body.

As shown, the carved block 41 can have a block-like shape that is disposed in a transfer direction of the vehicle body for the seat portion 35 of the moving member 30.

The carved block 41 may be fixed on the seat portion 35 of the moving member 30 and forms a "V" shape protrusion 43. Of course, other protrusion shapes can alternatively be used, if desired.

Meanwhile, the engraved block 16 of the common use side jig 10 as described above is fixed on a bottom surface of the matching portion 13 and forms a "V" shape groove 17 (or other shaped grove that corresponds with the protrusion 43) that can be engaged with the protrusion 43 of the carved block 41.

Accordingly, the matching portion 13 of the common use side jig 10 is seated on the seat portion 35 of the moving member 30 by a common use robot, and when the common use robot is separated from the common use side jig 10, the protrusion 43 is matched in the groove 17 of the engraved block 16 by a force or by gravity of the common use side jig 10. As such, the common use side jig 10 is controlled in a transfer direction and a height direction of the vehicle body in an exemplary embodiment of the present invention.

In an exemplary embodiment of the present invention, the sub-control unit 60 is configured and arranged to move the common use side jig 10 in a width direction of the vehicle body in a condition in which the carved block 41 is engaged with the engraved block 16, and the matching portion 13 of the common use side jig 10 is matched on the seat portion 35 of the moving member 30.

In the above arrangement, when the engraved block 16 is matched on the carved block 41, the common use side jig 10 is not disposed at one fixed position in a width direction of the vehicle body based on the carved block 41. In particular, the position of the common use side jig 10 in a width direction of the vehicle body can be varied according to several factors such as temperature, mechanical clearance, and so on.

Accordingly, the sub-control unit 60 moves the common use side jig 10 in a width direction of the vehicle body based on the moving member 30 and eliminates a matching gap (clearance) between the engraved block 16 and the carved block 41. As such, engagement distribution (an error) can be eliminated between the common use side jig 10 and the carved block 41.

According to an exemplary embodiment of the present invention, the sub-control unit 60 is configured on the moving member 30 and includes an operating cylinder 61 that is configured and arranged to move the common use side jig 10 that is matched on the carved block 41 of the moving member 30 in a width direction of the vehicle body.

The operating cylinder 61 may be operated by air pressure to be connected to the matching portion 13 of the common use side jig 10 through an operating rod (not shown) or the like.

The operating cylinder 61 can be generally in accordance with such conventional operating cylinders which are known to a person skilled in the art, and therefore the detailed description thereof will be omitted in this specification.

As shown, a combination block 63 is disposed on the operating rod of the operating cylinder 61, and the combination block 63 is engaged with the matching portion 13 of the common use side jig 10.

As such, the combination block 63 is combined with a combination portion 18 that is disposed on the matching portion 13 of the common use side jig 10 to be moved by the operating rod in a width direction of the vehicle body.

In the described embodiment, the combination block 63 is a plate type having a predetermined thickness, and the combination portion 18 has a "ㄱ" shape that can be engaged with one end portion of the combination block 63.

That is, when the matching portion 13 of the common use side jig 10 is seated on the seat portion 35 of the moving member 30, the combination portion 18 can be combined with the combination block 63.

Meanwhile, a stopper 39 can be disposed on the seat portion 35 of the moving member 30, and the stopper can be configured and arranged to determine the home position (original position) of the common use side jig 10 which is moved by the operating cylinder 61 in a width direction of the vehicle body.

In the present exemplary embodiment, the stopper 39 is used to control the engraved block 16 of the common use side jig 10, and integrally protrudes on one side of the carved block 41 corresponding to the vehicle body.

In particular, when the common use side jig 10 is moved by the operating cylinder 61 in a width direction of the vehicle body, the stopper 39 controls the engraved block 16 of the common use side jig 10 to eliminate the matching error of the engraved block 16 based on the carved block 41 and to determine a home position (original position) of the common use side jig 10 based on the moving member 30.

In an exemplary embodiment of the present invention, a clamper 80 is used to fix the matching portion 13 of the common use side jig 10 on the seat portion 35 of the moving member 30 in a condition in which the common use side jig 10 is returned to an original position (home position) of the moving member 30 by the main control unit 40 and the sub-control unit 60.

As shown, the clamper 80 is disposed on the moving member 30, and includes a clamp block 82 for clamping the matching portion 13 of the common use side jig 10. The clamp block 82 may be rotated by a clamp cylinder 81 as desired.

The structure of the clamper 80 can be generally in accordance with such conventional clampers which are known to a person skilled in the art, and therefore the detailed description thereof will be omitted in this specification.

Figure 6:
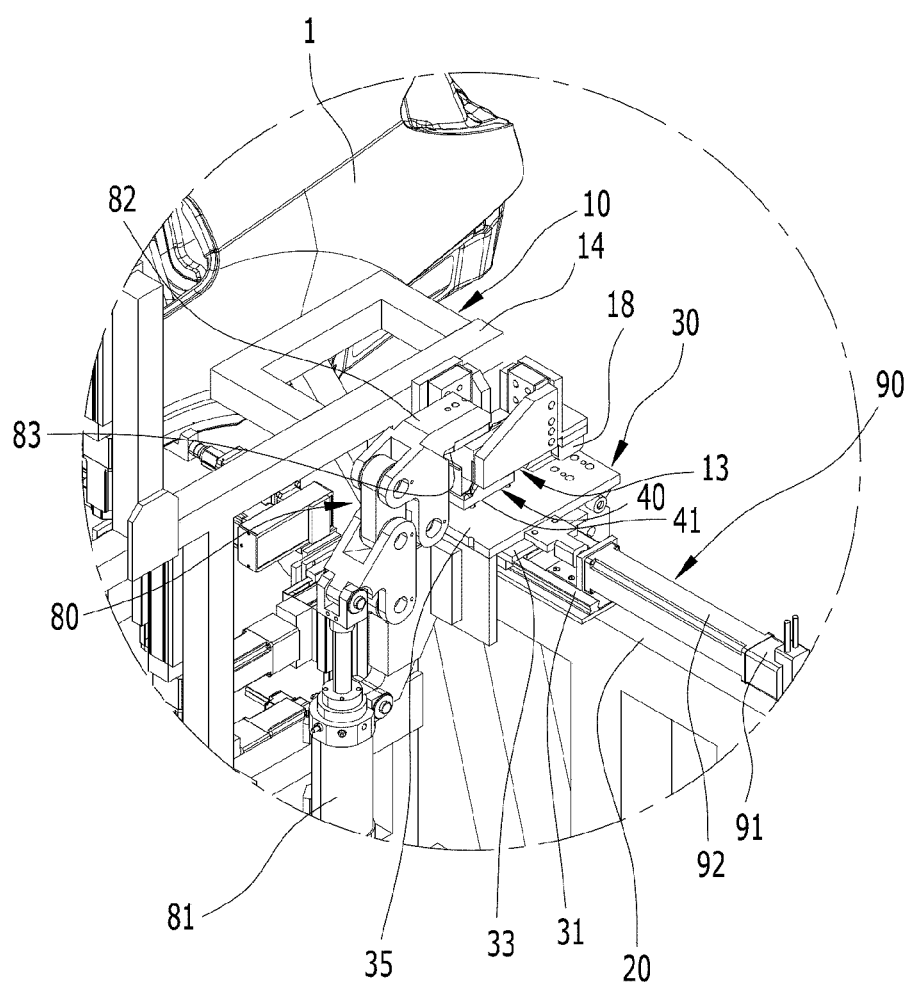
FIG. 6 shows a control structure of a clamper that is applied to a side home-position device according to an exemplary embodiment of the present invention.

Meanwhile, as shown in FIG. 6, a first slanted surface (83: shown in FIG. 1 and FIG. 5) is formed on the clamp block 82 of the clamper 80 corresponding to the matching portion 13 of the common use side jig 10.

When the clamp block 82 clamps the matching portion 13 of the common use side jig 10, the first slanted surface 83 is used to control the common use side jig 10 in a width direction and a height direction of the vehicle body with a clamping force of the clamp block 82.

That is, in a clamping operation, the first slanted surface 83 of the clamp block 82 is matched on a second slanted surface 19 (FIG. 4) that is disposed on the matching portion 13 of the common use side jig 10 so as to control the common use side jig 10 in a width direction and a height direction of the vehicle body.

As shown, the first slanted surface 83 may be formed at a side surface of the claim block 82 to be matched on the second slanted surface 19 which may be disposed on a side wall of the matching portion 13 when the clamp block 82 is rotated to perform clamping.

Accordingly, when the clamp block 82 of the clamper 80 clamps the matching portion 13 of the common use side jig 10, the first slanted surface 83 of the clamp block 82 is matched on the second slanted surface 19 of the matching portion 13 by the clamping force of the clamp block 82. As such, the common use side jig 10 is controlled in a width direction and height direction of the vehicle body.

Further, in an exemplary embodiment of the present invention, the drive portion 90 can be configured and arranged to move the common use side jig 10 to the original position of the moving member 30 by the main control unit 40 and the sub-control unit 60, and can move the moving member 30 in a width direction of the vehicle body so that the clamper 80 can fix the common use side jig 10 on the moving member 30.

In particular, the drive portion 90 can move the moving member 30 to a predetermined work position and can set the side panel 1 on the vehicle body corresponding to various widths of vehicle bodies according to the vehicle type.

The drive portion 90 can be disposed on the post upper surface of the post frame 20 corresponding to the moving member 30.

As shown in FIG. 1, the drive portion 90 includes an electric operating portion 92 that transforms a rotation movement of the motor 91 into linear movement of the moving member 30 so as to move the moving member 30 in a width direction of the vehicle body.

The electric operating portion 92 can include an operating rod 93 that is moved in a straight line by a motor 91. The operating rod 93 may be connected to the moving block 33 of the moving member 30.

The drive portion 90 includes an electric operation portion or a moving device which can be generally in accordance with such conventional electric operation portions and moving devices that are known to a person skilled in the art, and therefore the detailed description thereof will be omitted in this specification.

Hereinafter, a side home-position device 100 for a vehicle body assembly system that can be used for a various types of vehicles will be described according to an exemplary embodiment of the present invention with reference to the drawings.

Primarily, in a condition that a tool changer mounts the common use side jig 10 on an arm end of the common use robot, a side panel 1 that may vary according to the vehicle type is controlled by the control portions 11 of the common use side jig 10, and the common use side jig 10 is transferred to a main buck process through a common use robot.

In particular, the moving member 30 on the post frame 20 is moved in a width direction of the vehicle body by the drive portion corresponding to the width of the vehicle body.

In the above condition, a common use robot moves the common use side jig 10 to a position between the post frame 20 and the vehicle body, moves the matching portion 13 of the common use side jig 10 on the seat portion 35 of the moving member 30, and the common use robot is separated from the common use side jig 10.

In this case, the engraved block 16 of the matching portion 13 is matched with the carved block 41 of the moving member 30 (e.g. by the weight of the common use side jig 10) to control the common use side jig 10 in transfer and height directions of the vehicle body.

Also, the combination portion 18, which is disposed on the matching portion 13 of the common use side jig 10, is naturally combined with the combination block 63 of the sub-control unit 60.

Accordingly, when the engraved block 16 of the matching portion 13 is matched on the carved block 41 of the main control unit 40, the common use side jig 10 is disposed on the seat portion 35 of the moving member 30.

In the above case, when the engraved block 16 is matched on the carved block 41, the common use side jig 10 can be distributed along a width direction of the vehicle body based on the carved block 41. Thus, the common use side jig 10 is not accurately positioned in a width direction thereof.

Thus, the operating cylinder 61 of the sub-control unit 60 can be operated to move the combination block 63 to a vehicle body side (in a width direction of a vehicle body) by the operating rod of the operating cylinder 61.

Also, the common use side jig 10 can be moved by the combination block 63 in a width direction of the vehicle body, and the movement of the common use side jig 10 is stopped when the engraved block 16 is hooked/engaged by the stopper 39 of the carved block 41.

In particular, when the common use side jig 10 is moved by the operating cylinder 61 in a width direction of the vehicle body, the stopper 39 controls the engraved block 16 of the common use side jig 10, eliminates matching clearance of the engraved block 16 with the carved block 41, and determines a position of the common use side jig 10 based on the moving member 30.

Accordingly, the common use side jig 10 is moved by the sub-control unit 60 in a width direction of the vehicle body based on the moving member 30, and the matching clearance of the engraved block 16 with the carved block 41 can be eliminated such that the combination difference of the common use side jig 10 with the carved block 41 is reduced or eliminated.

As such, the common use side jig 10 is accurately positioned on the moving member 30 corresponding to the vehicle type by the main control unit 40 and the sub-control unit 60 in an exemplary embodiment of the present invention.

After the above processes, the clamp cylinder 81 of the clamper 80 is operated so that the clamp block 82 clamps the matching portion 13 of the common use side jig 10.

In particular, the first slanted surface 83 of the clamp block 82 is matched on the second slanted surface 19 of the matching portion 13 by the clamping force of the clamp block 82 to control the common use side jig 10 in a width and height direction of the vehicle body.

As described above, the common use side jig 10 can be accurately positioned on the moving member 30 by the main control unit 40, the sub-control unit 60, and the clamp block 82 of the clamper 80 in an exemplary embodiment of the present invention such that the common use side jig 10 is controlled in a transfer direction, a width direction, and a height direction of the vehicle body.

The drive portion 90 then moves the moving member 30 in a width direction of the vehicle body.

Then, the common use side jig 10, which is controlled by the moving member 30, is moved to a predetermined work position of a main buck process by the drive portion 90 in a width direction of the vehicle body.

As a result, the common use side jig 10 is accurately positioned to a predetermined work position in an exemplary embodiment of the present invention, and the side panel 1 can be accurately set on a predetermined position of the vehicle body.

As described above, according to an exemplary embodiment of the present invention, a side home-position device 100 for a vehicle body assembly system can be used for a variety of vehicle types, wherein the common use side jig 10 that commonly controls various kinds of side panels 1 that are to be assembled on a vehicle body is accurately positioned at a work position of a main buck process to accurately set the side panel 1 on the vehicle body.

Accordingly, various types of vehicles are flexibly manufactured in an exemplary embodiment of the present invention, and therefore a facility preparation time can be reduced and an initial investment cost is saved even when further vehicle types are added.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A return device for a vehicle body assembly system, which is used to return a side jig for common use that controls a side panel to an operation site of a main buck process, comprising:
   a post frame that is disposed in a vertical direction corresponding to the operation site of the main buck process;
   a movement member that is disposed at the post frame and is configured and arranged to be movable in a width direction of a vehicle body;
   a sub-control unit disposed on the movement member, the sub-control unit being configured to move the side jig in the width direction of the vehicle body;
   a main control unit in connection with the movement member, the main control unit being configured and arranged to return the side jig to an original position;
   a clamper disposed on the movement member and being configured and arranged to clamp a matching portion of the side jig for the movement member; and
   a drive portion that is disposed at the post frame and which is configured and arranged to move the movement member in the width direction of the vehicle body.

2. The return device of claim 1, wherein the movement member supports the side jig that is moved by a robot.

3. The return device of claim 1, wherein the movement member includes a plurality of seat portions on which the matching portion of the side jig can be disposed.

4. The return device of claim 3, wherein the main control unit includes a carved block that is disposed on the seat portion in a moving direction of a vehicle body.

5. The return device of claim 4, wherein the carved block corresponds to an engraved block that is disposed on the matching portion of the common use side jig, and wherein the carved block controls the side jig in a movement direction and a height direction of the vehicle body.

6. The return device of claim 5, wherein the carved block forms a V shape protrusion.

7. The return device of claim 6, wherein the protrusion is engaged with a V shape groove of the engraved block.

8. The return device of claim 4, wherein a stopper is integrally formed on the carved block to determine the original position of the side jig for the movement member.

9. The return device of claim 1, wherein the main control unit controls the side jig to correspond to the movement member.

10. The return device of claim 9, wherein the sub-control unit eliminates matching play of the side jig for the movement member.

11. The return device of claim 9, wherein the sub-control unit includes an operating cylinder that is disposed on the movement member, and which is connected to the side jig through an operating rod.

12. The return device of claim 11, wherein the movement member includes a plurality of seat portions on which the matching portion of the side jig can seat, and a combination block that is combined with the combination portion is disposed on the operating rod.

13. The return device of claim 11, wherein the movement member includes a plurality of seat portions where the matching portion that is disposed on the side jig can seat, and a stopper is disposed on the seat portion to determine an original position of the side jig that is moved by the operating cylinder.

14. The return device of claim 11, wherein the movement member includes a plurality of seat portions on which the matching portion of the side jig can seat,
   the main control unit includes a carved block that is disposed at the seat portion in a moving direction of the vehicle body, and
   a stopper is integrally formed on the carved block to determine an original position of the side jig that is moved by the operating cylinder.

15. The return device of claim 1, wherein the clamper includes a clamp block that is rotated by a clamp cylinder to clamp a matching part of the common use side jig for the movement member.

16. The return device of claim 15, wherein a first slanted surface is formed on the clamp block corresponding to the matching part of the side jig.

17. The return device of claim 16, wherein the clamp block is matched on a second slanted surface when the first slanted surface is disposed on the matching portion of the common use side jig so as to control the side jig in a width direction and a height direction of the vehicle body.

18. The return device of claim 1, wherein the movement member is movably disposed on a rail member that is disposed on the post frame.

19. The return device of claim 1, wherein the operating portion is configured and arranged to move the movement member to a predetermined position corresponding to a width of the vehicle body that varies depending on a vehicle type, and to set the side panel on the vehicle body.

* * * * *